Patented Dec. 25, 1945

2,391,415

UNITED STATES PATENT OFFICE 2,391,415

TREATMENT OF HYDROCARBONS

Aristid V. Grosse, Haverford, Pa., and Carl B. Linn, Riverside, Ill., assignors to Universal Oil Products Company, Chicago, Ill., a corporation of Delaware No Drawing. Application May 27, 1944, Serial No. 537,730

11 Claims. (Cl. 260—683.4)

This application is a continuation-in-part of our co-pending application Serial Number 311,363 filed December 28, 1939.

This invention relates to the treatment of isoparaffin hydrocarbons to produce higher molecular weight alkyl derivatives thereof, and is more specifically concerned with a method of alkylating isoparaffin hydrocarbons by the fragments of aliphatic hydrocarbon molecules produced by dissociation reactions concurrent with the reactions of addition to isoparaffin hydrocarbons.

It is to be recognized that in general the alkylation of isoparaffin hydrocarbons by gaseous olefinic hydrocarbons has been known for some time, particularly when employing a composite of hydrogen fluoride, boron fluoride, and nickel as catalyst to further the reaction. However, the present invention differentiates from previous art on this subject in the use of particular normally liquid olefinic starting material which is decomposed in the course of the alkylation reactions and in the use of other catalysts. The type of reaction with which this invention is concerned is therefore distinctly novel over prior art.

According to the present invention any of the isoparaffin hydrocarbons may be alkylated including isobutane and its homologues, obviously with somewhat modified conditions of operation when alkylating the various isoparaffins. The olefins employed contain at least 6 carbon atoms to the molecule and result from the polymerization of lower boiling olefins. With increasing molecular weight of the olefins the depolyalkylation reactions become progressively easier to accomplish.

Catalysts which may be employed in effecting the type of reactions which characterize the invention may comprise hydrogen fluoride, mixtures of boron fluoride and hydrogen fluoride, and aluminum halides with hydrogen halides, and particularly aluminum chloride with hydrogen chloride. The adaptation of these different compounds will depend upon the materials undergoing reaction, the temperature and corresponding phase conditions found most suitable, and the need for a more active or less active catalyst.

By the use of the reactions herein described, high molecular weight polymers of normally gaseous olefins such as ethylene, propene, or butenes may be reacted with an isoparaffin such as isobutane or isopentane to produce an essentially paraffinic product similar to that formed by interaction of the original isoparaffin with the individual normally gaseous olefin. For example, propene dimer and isobutane interact in the presence of a suitable catalyst to produce a saturated product containing a relatively high proportion of a heptane fraction similar to that produced by alkylating isobutane by propene.

Similarly n-butene, di-n-butene, tri-n-butene or tetra-n-butene, respectively, separately react with isobutane forming a saturated product, 90% of which boils below 400° F. and more than 50% boils in the octane range.

The process consists of reacting a mixture of isoparaffin hydrocarbons and olefin polymers in the presence of various catalysts using either a batch or a continuous process. For best results the isoparaffin must be kept in molar excess in respect to the olefin. That is, at least one isoparaffin molecule must be available to react with each olefin molecule or fragment produced by the depolymerization reaction.

In conducting the process of depolyalkylation employing a normally liquid or liquified isoparaffinic hydrocarbon and a normally liquid olefinic polymer, a simple procedure is to add a proportioned mixture of the hydrocarbons to a vigorously agitated liquid catalyst such as hydrogen fluoride of 90–100% concentration. Such a process may be made continuous by intimately mixing streams of liquid hydrogen fluoride and hydrocarbon mixtures and causing the materials to pass through mixing devices which maintain intimate contact for a sufficient time to insure completion of the desired reactions. In any event when the reactions are complete as determined by tests, the hydrocarbon layer is separated from the acid layer by either gravitational settling or centrifuging and the hydrocarbon layer fractionated to separate the desired alkyl derivatives.

When employing aluminum chloride as catalyst, a suspension of this material in the hydrocarbon mixture may be agitated in batch treaters preferably in the presence of hydrogen chloride until the reactions have been completed or as before in the case of hydrogen fluoride, the mixture may be passed through a tortuous path in some type of baffled mixer to accomplish the same results.

The temperature of treatment of any given isoparaffin with higher molecular weight olefins to effect alkylation with the olefin depolymerization products will necessarily vary with the molecular weight of the olefin, the activity of the catalyst, and other factors.

Pressure, functioning principally to prevent loss of material by vaporization, may be used when temperatures substantially above atmospheric or approaching the boiling points of the hydrocarbons are employed.

Several of the catalysts and the methods of using them for promoting depolyalkylation reactions will be described in the following paragraphs.

A mixture of an isoparaffin and a fraction of olefin polymers is contacted with anhydrous hydrogen fluoride at a temperature of the order of 0–300° F. under a pressure in the range of substantially atmospheric to approximately 200 pounds per square inch. As this reaction has been found to progress satisfactorily at relatively low pressures, the use of excessive pressures is unnecessary. After separating the products and catalyst which have been contacted in a continuous apparatus, the recovered catalyst as well as heavier fractions of the reaction product may be recycled to further alkylation treatment. If contacted in a batch operation the reacting hydrocarbons are agitated with the catalyst for a period of time after which the product is separated and distilled. Contact times of 1–60 minutes are usable although the reaction may not reach completion if the contact time is relatively short.

When aluminum chloride is employed as catalyst for the alkylation of isoparaffins by olefin polymers it is necessary to introduce with the reaction mixture 1–30% by volume of dry hydrogen chloride or sufficient water to produce hydrogen chloride by hydrolysis of a portion of the aluminum chloride present. In batch operations the reactants are agitated for 10–100 minutes in an autoclave containing aluminum chloride and hydrogen chloride and maintained at a temperature in the approximate range of 0–300° F. under a pressure from substantially atmospheric to approximately 200 pounds per square inch.

Boron fluoride in the presence of 1–30% by weight of hydrogen fluoride may similarly catalyze depolyalkylation under conditions similar to those found effective with aluminum chloride.

In the commercial application of the alkylation reaction it is often necessary to utilize as charging stocks refinery gases of relatively low olefin concentration. In such gases the olefin is diluted with relatively high proportions of propane and n-butane which are not adaptable to alkylation. The present invention makes it possible to concentrate the olefins in such gases by polymerizing the gaseous olefins to liquid polymers which, by means of depolyalkylation, may be caused to react with isoparaffins and form essentially the same type of low boiling saturated motor fuel which could have been obtained from reacting the simple olefins with the isoparaffin in the first place if the concentration of the normally gaseous olefin had originally permitted the reaction to be carried out satisfactorily.

To illustrate the type of reaction involved in the present process the following equation is given which indicates the reactants and the principal product formed when depolyalkylation is brought about between isobutane and the dimers of isobutene which consist principally of 2,4,4-trimethylpentene-1 and 2,4,4-trimethylpentene-2. The following equation is given for the first named compound:

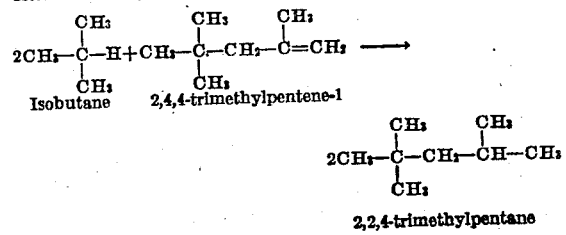

Isobutane    2,4,4-trimethylpentene-1

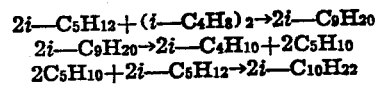

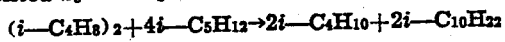

2,2,4-trimethylpentane

It is evident from the course of the reaction as indicated by the above structural equation that the octene undergoes scission at the bond between two carbon atoms to produce two tertiary butyl groups which react with isobutane producing two molecules of iso-octane. Since similar products are obtained when di-isobutene, produced by the polymerization of isobutene, is substituted for the single compound in the above reaction, it is evident that 2,4,4-trimethylpentene-2 undergoes a similar splitting.

In the case of olefins having an odd number of carbon atoms such as heptenes, nonenes, or higher molecular weight olefinic compounds, the reactions will be of somewhat more complicated nature since the break between carbon atoms may occur at different points in the aliphatic chain and produce different types of alkylated isoparaffin hydrocarbons. For instance a heptene may yield substantial quantities of propyl- and butyl-substituted compounds while a nonene may yield propyl, or butyl and amyl derivatives due to its depolymerization into three molecules of propene, or to splitting into one molecule each of butene and pentene.

Furthermore, the paraffinic product such as isooctane which may be formed by depolyalkylation of isobutane by di-isobutene or tri-isobutene may undergo splitting or decomposition reactions which may be classed as destructive alkylation so that the ultimate product consists of a complex mixture of paraffins rather than the expected product. For example, the reactions occurring between isopentane and di-isobutene in the presence of an alkylation catalyst may be represented as follows:

$$2i\text{—}C_5H_{12} + (i\text{—}C_4H_8)_2 \rightarrow 2i\text{—}C_9H_{20}$$
$$2i\text{—}C_9H_{20} \rightarrow 2i\text{—}C_4H_{10} + 2C_5H_{10}$$
$$2C_5H_{10} + 2i\text{—}C_5H_{12} \rightarrow 2i\text{—}C_{10}H_{22}$$

The net result of these reactions may be represented by the equation:

$$(i\text{—}C_4H_8)_2 + 4i\text{—}C_5H_{12} \rightarrow 2i\text{—}C_4H_{10} + 2i\text{—}C_{10}H_{22}$$

An observation made in the case of the alkylation of iso-pentane was that one isobutene molecule or fragment involved more than one molecule of paraffin in the reaction. How it is possible for more paraffin than olefin to react in such alkylation reactions is shown in the above equations.

The following examples are given to indicate results which are typical of the process although they are not presented with any intention of unduly limiting the broad scope of the invention.

*Example I*

To a nickel-lined autoclave containing 10 parts by weight of nickel powder and 150 parts by weight of nickel shot was added 5 parts by weight of hydrogen fluoride, 10 parts by weight of boron fluoride, 247 parts by weight of isobutane and 130 parts by weight of di-isobutene. Addition of the solution of di-isobutene in iso-butane to the catalyst mixture was gradual over a period of one hour, after which the autoclave and its contents were rotated at 30–40° F. under an average pressure of 65 pounds per square inch for an additional hour. At the end of this time the products were removed, separated, and found to consist of 230 parts by weight of a substantially paraffinic hydrocarbon liquid, 107 parts by weight of isobutane and 15 parts by weight of a lower layer containing hydrogen fluoride. Fractional distillation of the liquid product showed it to contain 42% by volume of isomeric octanes and a total of 92% by volume of gasoline with 437° F. end point. Calculation showed that each molecule of di-isobutene reacted with 1.5 molecules of isobutane.

Example II

A nickel-lined autoclave similar to that used in Example I was charged with 10 parts by weight of nickel powder, 150 parts by weight of nickel shot, 4.5 parts by weight of hydrogen fluoride, and 10.5 parts by weight of boron fluoride. This catalyst mixture was maintained at 30–40° F. while a solution of 126 parts by weight of di-normal butene in 250 parts by weight of isobutane was added gradually during one hour, after which the autoclave was rotated for 0.5 hour under an average pressure of 55 pounds per square inch. The products separated from the reaction mixture consisted of 246 parts by weight of liquid hydrocarbons, 120 parts by weight of iso-butane, and 13 parts by weight of a lower layer containing hydrogen fluoride and some boron fluoride. Purification and fractional distillation of the liquid product showed it to contain 55% by volume of isomeric octanes and a total of 85% by volume of gasoline with 437° F. end point. Each molecule of di-normal butene subjected to this alkylation reacted with 1.5 molecules of isobutane.

The novelty and utility of the process of this invention are evident from the preceding specification and the numerical data presented, although neither section is intended to be unduly limiting upon the proper scope of the invention.

We claim as our invention:

1. A process for alkylating isoparaffinic hydrocarbons which comprises contacting said isoparaffinic hydrocarbons with an olefin polymer containing at least 6 carbon atoms to the molecule in the presence of hydrogen fluoride and under conditions whereby to depolymerize said polymers and alkylate the isoparaffin with olefinic fragments thereof.

2. A process for alkylating isoparaffinic hydrocarbons which comprises contacting said isoparaffinic hydrocarbons with an olefin polymer containing at least 6 carbon atoms to the molecule in the presence of a mixture of hydrogen fluoride and boron fluoride and under conditions whereby to depolymerize said polymers and alkylate the isoparaffin with olefinic fragments thereof.

3. A process for converting low boiling isoparaffins into higher molecular weight alkyl derivatives thereof which comprises commingling an olefin polymer of at least six carbon atoms to the molecule with a molar excess of a predominantly isoparaffinic fraction whose isoparaffin content consists essentially of at least one isoparaffin of not more than five carbon atoms to the molecule, and subjecting the resultant mixture to the action of an alkylation catalyst under conditions to depolymerize said polymer and alkylate the isoparaffin with olefinic fragments of the polymer.

4. An alkylation process which comprises commingling an olefin polymer of at least six carbon atoms to the molecule with a molar excess of isobutane and subjecting the resultant mixture to the action of an alkylation catalyst under conditions to depolymerize said polymer and alkylate the isobutane with olefinic fragments of the polymer.

5. An alkylation process which comprises commingling an olefin polymer of at least six carbon atoms to the molecule with a molar excess of isobutane and subjecting the resultant mixture to the action of an alkylation catalyst comprising hydrogen fluoride under conditions to depolymerize said polymer and alkylate the isobutane with olefinic fragments of the polymer.

6. A process for the production of high antiknock motor fuel hydrocarbons which comprises polymerizing a normally gaseous olefin of at least 3 carbon atoms to form a normally liquid polymer thereof, and then reacting said polymer with isobutane, to form an isoparaffin boiling in the gasoline range.

7. A process for the production of motor fuel constituents comprising essentially branched chain saturated hydrocarbons boiling within the motor fuel range which comprises reacting a normally liquid polymer of a normally gaseous mono-olefin with at least one isoparaffin in the presence of an alkylating catalyst under alkylation reaction conditions.

8. A process for the production of motor fuel constituents comprising essentially branched chain saturated hydrocarbons boiling within the motor fuel range which comprises reacting a normally liquid polymer of a normally gaseous mono-olefin with at least one isoparaffin in the presence of an alkylating catalyst comprising hydrogen fluoride under alkylation reaction conditions.

9. A process for the production of high antiknock motor fuel hydrocarbons which comprises polymerizing propene to form a normally liquid polymer thereof, and then reacting said polymer with iso-butane, to form an isoparaffin boiling in the gasoline range.

10. A process for the production of high antiknock motor fuel hydrocarbons which comprises polymerizing a normally gaseous olefin of at least 3 carbon atoms to form a normally liquid polymer thereof, and then reacting said polymer with iso-butane in the presence of an alkylating catalyst comprising hydrogen fluoride to form an isoparaffin boiling in the gasoline range.

11. A process for the production of motor fuel constituents comprising essentially branched chain saturated hydrocarbons boiling within the motor fuel range which comprises reacting a propene polymer with at least one isoparaffin in the presence of an alkylating catalyst under alkylation reaction conditions.

ARISTID V. GROSSE.
CARL B. LINN.